Oct. 21, 1941.  W. R. RYAN  2,259,706
LIQUID LEVEL CONTROLLING AND INDICATING MECHANISM
Filed Jan. 18, 1940  2 Sheets-Sheet 1
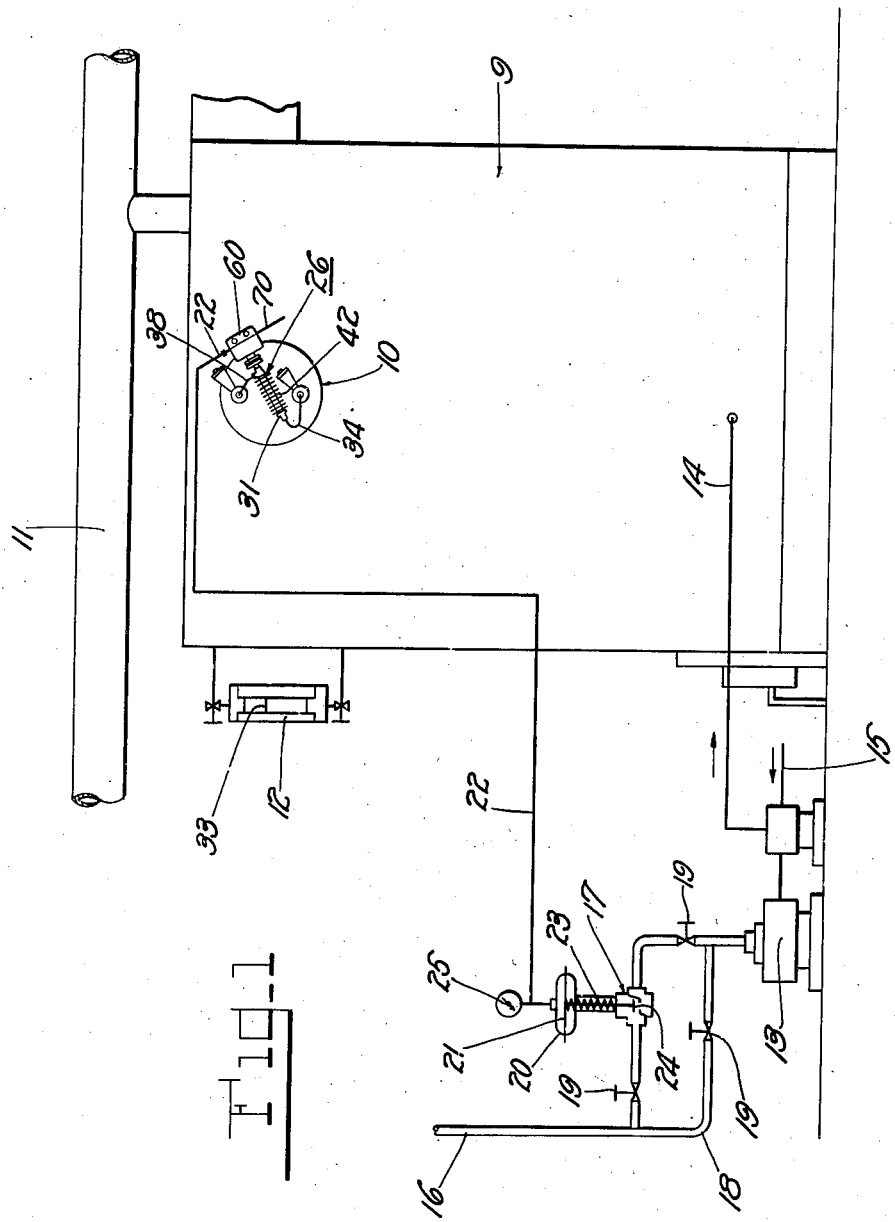
INVENTOR:
WILLIAM R. RYAN
BY Cannon MacLeod
ATTORNEY.

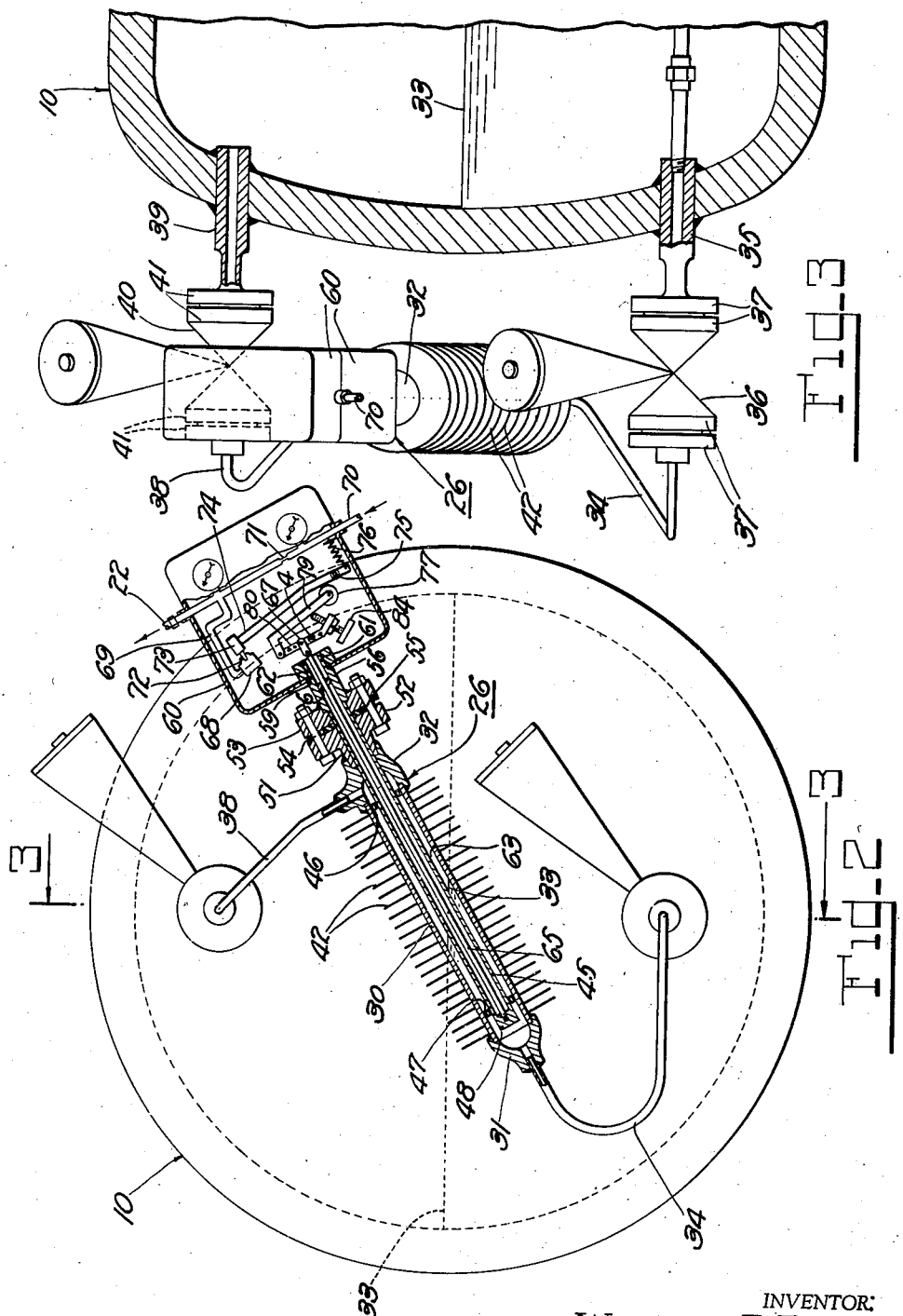

Patented Oct. 21, 1941

2,259,706

UNITED STATES PATENT OFFICE 2,259,706

LIQUID LEVEL CONTROLLING AND INDICATING MECHANISM

William R. Ryan, Alpine, N. J.

Application January 18, 1940, Serial No. 314,570

8 Claims. (Cl. 122—451.1)

This invention relates to apparatus for controlling and/or indicating liquid level in steam boilers, vapor generating vessels, or the like, and primarily concerns an improvement in liquid level responsive devices of the thermostatic type, namely, those devices which respond to changes in liquid level by means of a temperature differential.

Liquid level apparatus of the kind to which this invention relates is provided with an expansible element which is subjected both to the temperature of the generator vapor and to the temperature of a part of the generator liquid, and is so constructed and arranged that a difference in temperature between the vapor and liquid is effected, by reason of which differential changes in liquid level in the vessel are responded to.

It has been my experience that thermostatic liquid level responsive devices as heretofore constructed, so far as known to me, are subject to error and are slow in response to changes in liquid level, and that while such devices are reasonably adequate for use in connection with vapor generators having a low rate of vaporization in relation to their liquid storage capacity, they are not adapted to modern requirements, as, for example, to steam boilers in which the water storage capacity has been sharply reduced and the more rapid circulation and greater steaming capacity demand a prompt and accurate response to changes in water level unaffected either by boiler pressure changes or by ambient temperature variations. I further find that because of the time lag inherent in such devices, an operating cycle is created both in respect to liquid level and generator pressure, by reason of which an uneven rate of vaporization occurs and other disadvantages result.

It is an object of this invention to provide a thermostatic liquid level responsive device in which the generator fluid is directly subjected to a maximum atmospheric cooling effect whereby a wide differential between the temperature of the vapor and that of the liquid surrounding the expansible element may be obtained, and further to so arrange the parts that the expansible element is directly subjected to the said temperature differential so that an immediate reaction and a maximum response per increment of level change is produced.

It is still another object of this invention to combine with the means hereinabove referred to a sensitive pilot mechanism by which an operating fluid may be controlled for actuating a liquid level indicating and/or controlling apparatus and further to so arrange the parts that the liquid level may be adjusted as desired.

It is still another object of this invention to provide an improved level responsive device which may be readily adapted to various generator or boiler requirements and which is of rugged construction and suited to many varying service conditions.

These and other apparent objects and advantages are obtained by the means described in the following specification, and may be more readily understood by reference to the accompanying drawings, in which:

Fig. 1 is a diagrammatic view of a steam boiler having a water feed pump with an automatic steam control valve governed by a level responsive device embodying my invention;

Fig. 2 is an enlarged view, partly diagrammatic and partly in section, of the level responsive device shown in Fig. 1; and Fig. 3 is a side elevation of the mechanism shown in Fig. 2, the view being partly in section on the line 3—3 of Fig. 2.

Having reference to Fig. 1 of the drawings, there is shown at 9 a steam boiler of any standard construction having a steam drum 10, a steam header 11, a gauge glass 12, and a feed water pump 13, the last mentioned serving to supply water to the boiler through a pipe 14 from a feed line 15. As herein shown, the pump is driven by steam supplied from the steam header 11 by a pipe 16, a suitable control valve 17 being installed in the steam supply line 16, and the usual by-pass 18 with associated valves 19 being provided in the customary manner. The boiler 9 and pump 13 are herein shown for purposes of illustration only, it being understood that any form of vapor generator and liquid level control mechanism may be used in connection with my device.

The control valve 17 may be provided with a diaphragm chamber 20 one wall of which is formed by a flexible diaphragm 21 responsive to controlled fluid pressure supplied through a line 22 which, together with an associated spring 23, may be used to actuate a valve member 24 in the usual manner. The valve herein illustrated is of the direct acting type, i. e., the valve member 24 is moved toward closed position on an increase of controlled fluid pressure and is opened by the spring 23 on a decrease in fluid pressure. The controlled fluid pressure line 22 may be provided with an indicating pressure responsive gauge 25 of any standard construction, which may be calibrated to indicate the level of water in the boiler in accordance with the controlled pressure as governed by a thermo-sensitive level control device embodying my invention generally indicated at 26.

The level control device is more clearly illustrated in Figs. 2 and 3, and comprises a tubular casing 30 having heads 31 and 32 secured to the ends thereof as by welding, the former being connected to the boiler drum 10 at a point below its water level 33 by means of a tube 34 and a connection 35, said connection having a suitable hand valve 36 to which the connection and tube may be secured by means of flanges 37. The head 32 is connected to the boiler at a point in the vapor space through a tube 38 and a connection 39 similar to the connection 35 just described, and may also be supplied with a hand valve 40 secured to the tube 38 and connection 39 by suitable flanges 41. The tubular casing 30 may be provided with cooling fins 42 integral therewith or secured in any well known manner, and is preferably mounted at an angle to the horizontal and vertically located so that the normal range of working level of the boiler water is substantially midway the ends of the tubular casing 30 as illustrated. I do not wish, however, to limit myself to any particular angle of setting, as my experience shows that the device operates satisfactorily when the axis of the tubular casing assumes almost any position which is transvere to the liquid level, from an oblique angle, as illustrated, to one which may be vertical.

Within the tubular casing 30 and extending axially thereof is a metallic tube 45 of stainless steel or like material having a relatively high coefficient of expansion. The tube 45 is loosely mounted in perforated guides 46 and 47 and is provided with a closed end 48 located in the general vicinity of the lower head 31, the opposite end of the tube being arranged to project through a suitable opening in the upper head 32 as shown. The upper head 32 may have a recess adapted to receive a hub 51 herein shown as integral with a flange 52, the hub being secured to the upper head 32 as by welding. The flange 52 is associated with a second flange 53 to which it is secured by means of bolts 54, a suitable gasket 55 being compressed between the flanges against the wall of the expansible tube 45 to make a tight fit therewith. The outer end of the expansible tube 45 is preferably of larger outside diameter than the rest of the tube, and for this purpose has a relatively heavy wall portion 56 which is received within a recess in the flange 53 and secured thereto as by welding. The outer end of the thickened portion 56 may be provided with a shoulder 59 and is adapted to support a pilot instrument case 60 which has an opening suitable to receive a threaded extension 61 provided on the thickened wall portion 56, the case 60 being clamped against the shoulder 59 by a nut 62. It will be understood from the above that the expansible tube 45 is supported axially of the tubular casing 30 by means of the flanges 52 and 53, so that axial movement due to expansion of the tube 30 occurs at the closed end 48. It will also be understood that the boiler water assumes a level in the space 63 formed between the tubular casing 30 and the expansible tube 45 which corresponds to the water level in the boiler. It will be further understood that the closed end 48 assumes an axial position in accordance with the average temperature of the expansible tube, the outer surface of which is in direct contact with the boiler water and steam.

The closed end 48 of the expansion tube 45 is provided with a stem 65, of quartz, Invar metal or any material having a minimum co-efficient of expansion, said stem being guided by a member 6 and serving to operate a pilot relay to which it is connected by means of a link 67. The pilot relay consists of a nozzle 68 supplied with air or similar operating fluid through a pipe 69 which is in turn connected with an air supply line 70 having a restricted orifice 71, pipe 69 being also connected to the pipe 22 leading to diaphragm chamber 20 of motor valve 17 described above, or to any suitable pressure actuated device for operating indicating mechanism or for controlling pumps, valves, or like devices for governing the liquid level. The nozzle 68, as herein shown, is fixed and has a bleed orifice 72 which cooperates with a valve member 73 carried on an arm 74 pivoted at 75 and urged toward the orifice 72 by means of a spring 76 connected at one end to the arm and at the other end to the instrument case 60. A wheel 77 adapted to engage the arm 74 is carried at one end of an angle member 79 which is pivoted at its opposite end to a lever 80. The lever 80 is pivoted at 4 to the case 60 and is operatively connected with the stem 65 by the link 67, suitable additional pivot holes in the lever 80 being provided so that the pivot 4 may be variously positioned to regulate the movement of parts or may be placed on the other side of said link to reverse the operation from that illustrated. Means for adjusting the angle member 79, and consequently the position of the valve member 73, relatively to the cooperating bleed orifice 72 may comprise a micrometer screw 84 threaded into the upturned end of the lever 80 and provided with a suitable lock nut. It will be understood from the above that when the micrometer screw is turned counterclockwise the valve member 73 is adjusted toward closed position, and when the micrometer screw is turned clockwise the valve member is moved toward open position, and that by this means the relative position of the orifices 72 and valve member 73 may be set to provide the control valve 17 with a predetermined valve opening at any selected axial position of the free end of the stem 65.

In operation, on a decrease of water level in the boiler 9 more of the tube 45 is exposed to the vapor temperature and the tube expands drawing the free end of stem 65 inwardly and swinging lever 80 in a counterclockwise direction around pivot 4. Wheel 77 is thus raised and valve member 73 is moved away from its seat 72. As valve member 73 opens, the pressure on line 69, on pipe 22, and in diaphragm chamber 20 of motor valve 17, is reduced and valve member 24 is opened to increase the speed of pump 13 and the rate of feed water input. On an increase of water level in the boiler, less of the tube 45 is exposed to the vapor temperature and the tube contracts, moving the free end of stem 65 outwardly and swinging the lever 80 clockwise about the pivot 4, thereby increasing the pressure in diaphragm chamber 20 and reducing the speed of pump 13.

In thermo-sensitive level responsive devices the sensitivity of operation not only depends on the ability of the expansible member to afford an immediate reaction to an initial change in temperature, but also depends on the organization of associated parts to afford a maximum change in average temperature throughout the expansible member for any given level variation the value of which is being measured. I have, therefore, subjected the boiler water and steam to the cooling effect of the atmosphere by placing the water and steam in direct contact with the tubular casing, and have increased the cooling effect by the use of the fins 42 described above, and have also transmitted any temperature change immediately to the expansible tube 45 by placing the latter in direct contact with the water and steam. In the casing 30 the average temperature of the water and that of the steam vary by an amount depending on the circulation of the water in the casing. By reason of the direct contact of the steam and water with the atmospheric cooling medium transmitted through the fins 42 and wall of the casing 30, the steam condenses at a relatively rapid rate in the steam space, and the water thus supplied to the water space, acting in conjunction with the cooling area around the water space, provides a constant circulation downwardly through the casing, and rapidly cools off the water, so that a wide temperature differential between the temperature of the vapor and that of the water at the lower part of the casing is obtained. The direct contact of the walls of the expansible tube 45 with the steam and water causes the tube to assume immediately a change in axial length corresponding to its average temperature and therefore to react immediately to a change in boiler water level. I have found from tests that the device herein disclosed is capable of affording a temperature drop from a steam temperature of 465° F. to a water temperature at the lower end of the expansible tube 45 of 215° F. By reason of this wide differential a relatively large movement is afforded to the stem 65 per increment change in boiler water level, and by combining this action with the sensitive pilot hereinabove described the parts may be adjusted to move valve member 24 of valve 17 throughout its full travel on a slight variation in boiler water level.

The liquid level responsive device embodying this invention may be of compact construction because a maximum temperature differential is produced for the radiating surface, and it may be fabricated in a standard size which is equally well adapted to vapor generators of varying capacities and types. Furthermore, the device is unaffected by changes in generator pressure and may be readily adjusted to the required liquid level to provide a sensitive response for accurate indication or control.

While I have described the apparatus embodying my invention in more or less detail, I do not wish to be limited to the exact construction shown, but desire to cover the general features specified in the following claims within the scope of this invention.

I claim:

1. In a liquid level responsive device for a vapor generator, the combination with a fluid pressure actuated member to be governed by said device, of a fluid pressure system in operative connection with said member and a source of fluid under pressure for said system, a pilot valve for governing the pressure in said system, a casing, means for connecting the interior of said casing to said vapor generator at points above and below the level of liquid therein, a tubular thermostatic expansion member in said casing partly submerged in said liquid having an open end rigidly attached to said casing and a closed end free to move in relation thereto, and means associated with the closed end of said tubular member for controlling said pilot valve.

2. In a liquid level responsive device for a vapor generator, the combination with a fluid pressure actuated member to be governed by said device for determining the level of liquid in said generator, of a fluid pressure system in operative connection with said member and a source of fluid under pressure for said system, a pilot having a valve member for governing the pressure in said system, a casing, means for connecting the interior of said casing to said vapor generator at points above and below the level of liquid therein, a tubular thermostatic expansion member in said casing partly submerged in said liquid having an open end rigidly attached to said casing and a closed end free to move in relation thereto, and means functioning within said tubular member for connecting its closed end with said pilot valve member.

3. A liquid level responsive device for a vapor generator having a casing, means for connecting the interior of said casing to said vapor generator at points above and below the level of liquid therein, a tubular thermostatic expansion member in said casing partly submerged in said liquid having an open end rigidly attached to said casing and a closed end free to move in relation thereto, a fluid pressure operating system having a source of fluid under pressure for determining the level of liquid in said generator, a pilot mechanism for governing the pressure in said system, and means within said tubular member secured to its closed end for transmitting movement of said closed end through said tubular member to said mechanism.

4. A liquid level responsive device for a vapor generator having a casing, means for connecting the interior of said casing to said vapor generator at points above and below the level of liquid therein, a tubular thermostatic expansion member in said casing partly submerged in said liquid having an open end attached to said casing and a closed end free to move in relation thereto, a fluid pressure operating system having a source of fluid under pressure for governing the level of liquid in said vapor generator, a pilot mechanism for controlling the pressure in said system, and means mounted substantially axially of said tubular member for operatively connecting its closed end to said pilot mechanism.

5. A liquid level responsive device for a vapor generator having a casing, means for connecting the interior of said casing with said generator at points above and below the level of liquid therein, said casing having an opening, a tubular thermostatic expansion member extending through said opening into said casing and partly submerged in said liquid, the inner end of said tubular member being closed and the outer end thereof being open and secured rigidly to the walls of said opening to make a pressure tight joint with said casing, a fluid pressure operating system for determining the level of liquid in said vapor generator having a source of fluid under pressure, a pilot mechanism for governing the pressure in said system, and a stem operatively connecting the closed end of said tubular member with said pilot mechanism.

6. A liquid level responsive device for a vapor generator having a casing, means for connecting the interior of said casing to said vapor generator at points above and below the level of liquid therein, said casing having an opening, a tubular thermostatic expansion member partly submerged in said liquid having an open end fixedly mounted within the opening of said casing to make a pressure tight joint therewith and having a closed end free to move in relation to said casing, a fluid pressure operating system for determining the level of liquid in said vapor generator having a source of fluid under pressure, a pilot mechanism for governing the pressure in said system, and a stem connected to said closed end and extending substantially axially of said tubular member to said open end and operating said pilot mechanism.

7. A liquid level responsive device for a vapor generator having a tubular casing one end of which is closed and the other end of which is open, means for connecting the interior of said casing to said vapor generator at points above and below the level of liquid therein, a tubular thermostatic expansion member having an open end rigidly mounted within the open end of said casing to make a pressure tight joint therewith and having a closed end free to move in relation to said casing, a fluid pressure operating system for governing the level of liquid in said vapor generator having a source of fluid under pressure, a pilot mechanism mounted on said casing adjacent the open end of said tubular member for governing the pressure in said system, and a stem having one end mounted in said tubular member at the closed end thereof and the other end operatively connected with said pilot mechanism through the open end of said tubular member.

8. A liquid level responsive device for governing a feed water regulating mechanism to a vapor generator in accordance with variations in the level of liquid therein, comprising in combination, a tubular casing having fluid connections with said generator at points above and below the range of allowable level change, a plurality of cooling fins on said casing forming a finned section extending above and below the limits of said level range, a tubular thermostatic expansion element disposed substantially axially of said casing having a free end which is closed and an open end which projects through a wall of said casing and is secured thereto to make a pressure tight joint, said tubular expansion element being partly submerged in the liquid in said casing and providing a fluid passage along the walls of said finned section whereby that portion of said expansible element which is submerged in liquid is responsive to the atmospheric cooling effect imparted to said liquid by said fins and that portion of said thermostatic element which is immersed in vapor is insulated by the vapor from the cooling effect imparted by said fins, a source of fluid pressure, a fluid pressure system connected therewith the pressure in which governs said feed water regulating mechanism, a pilot mounted on said casing for governing the pressure in said system, a member mounted adjacent the open end of said tubular expansion element in operative connection with said pilot, and a stem in said tubular expansion element operatively connecting the closed end of said tubular expansion element with said pilot operating member.

WILLIAM R. RYAN.